(12) United States Patent
Chevalier

(10) Patent No.: US 6,918,480 B2
(45) Date of Patent: Jul. 19, 2005

(54) CENTRIFUGAL CLUTCH

(76) Inventor: John Phillip Chevalier, Flat 2, 9 Oakhill Avenue, London NW3 (GB)

(*) Notice: Subject to any disclaimer, the term of this patent is extended or adjusted under 35 U.S.C. 154(b) by 0 days.

(21) Appl. No.: 10/221,684

(22) PCT Filed: Mar. 15, 2001

(86) PCT No.: PCT/GB01/01138
§ 371 (c)(1),
(2), (4) Date: Nov. 26, 2002

(87) PCT Pub. No.: WO01/69101
PCT Pub. Date: Sep. 20, 2001

(65) Prior Publication Data
US 2003/0183477 A1 Oct. 2, 2003

(30) Foreign Application Priority Data
Mar. 15, 2000 (GB) .............................. 0006169

(51) Int. Cl.⁷ .............................................. F16D 43/16
(52) U.S. Cl. .................... 192/105 BB; 192/105 CE; 192/103 B
(58) Field of Search .............. 192/105 BA, 105 BB, 192/105 CD, 105 CE, 105 CF, 103 B

(56) References Cited

U.S. PATENT DOCUMENTS

| | | | |
|---|---|---|---|
| 2,433,553 A | * 12/1947 | Heintze ................... | 192/103 B |
| 2,753,031 A | * 7/1956 | Light ..................... | 192/104 B |
| 3,251,445 A | 5/1966 | Zuck et al. | |
| 3,610,382 A | * 10/1971 | Makinson .................... | 192/95 |
| 3,938,633 A | * 2/1976 | Dietzsch et al. ............ | 192/48.3 |
| 4,003,458 A | * 1/1977 | O'Steen ................ | 192/105 BB |
| 4,736,829 A | 4/1988 | Noel | |
| 5,908,101 A | 6/1999 | Watanabe | |

FOREIGN PATENT DOCUMENTS

| | | |
|---|---|---|
| NL | 58 570 C | 12/1946 |
| WO | WO 01/69101 A1 | 9/2001 |

* cited by examiner

Primary Examiner—Richard M. Lorence
(74) Attorney, Agent, or Firm—Stetina Brunda Garred & Brucker

(57) ABSTRACT

A centrifugal clutch for coupling a drive shaft (11) to a driven member (13) at rotary speeds above a predetermined threshold, comprising: a centrifugal slider (15) with a massive enlargement (155) at one end and a first coupling formation (156) preferably at the other end; a frame (12) formed to carry the centrifugal slider on formations (121, 122, 123, 124) to constrain it to sliding motion between an extended radial position and a retracted radial position, and to fit on the drive shaft to be driven by it, with the shaft at right-angles to the axis of sliding motion of the frame: an output drive member mountable for free rotation on the drive shaft and formed for driving engagement with the driven member in use, and formed with a second coupling formation (131) which connects drivingly with the first only when the centrifugal slider is at its extended position; and means (16) preferably located wholly within a recess (151) in the centrifugal slider, for biasing the centrifugal slider toward its retracted position; whereby rotation of the centrifugal slider and frame causes the massive enlargement to pull the centrifugal slider radially from its retracted to its extended radial position to cause the first (155) and second coupling arrangements to interengage and thus to transmit rotary drive from the drive shaft to the driven member, but the biasing means causes disengagement when the rotation ceases, so as to decouple the drive shaft from the driven member.

17 Claims, 3 Drawing Sheets

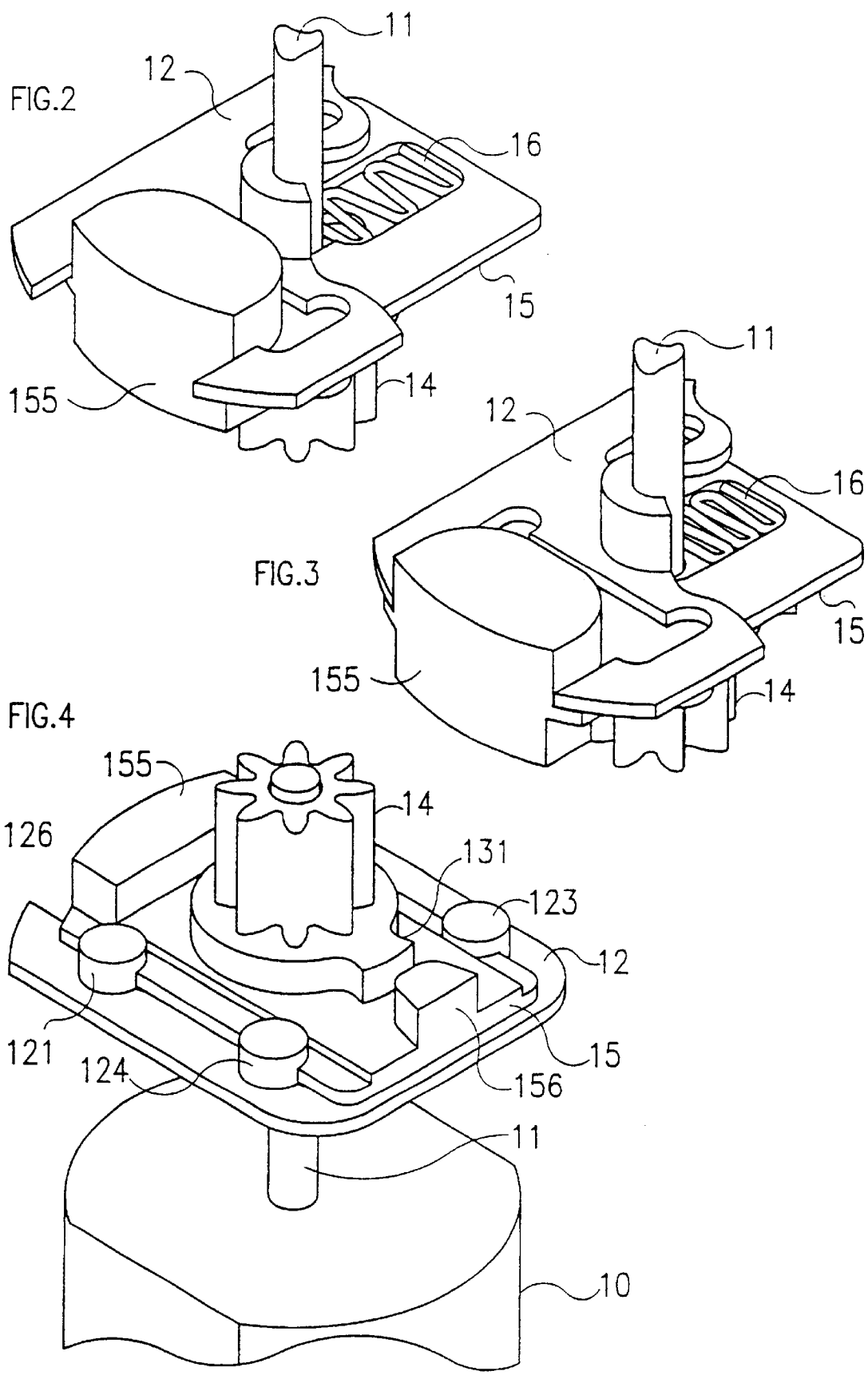

CENTRIFUGAL CLUTCH

This invention relates to a centrifugal clutch for coupling a drive shaft to a driven member. Centrifugal clutches are required for example in latch arrangements for automotive doors, as disclosed in WO98/27301, where an electric drive motor has to be decoupled from the latch, which is the driven member, to allow manual actuators to operate the latch, so as to avoid jamming particularly on power failure.

Centrifugal clutches are of course available in many different forms. The purpose of the present invention is to provide a centrifugal clutch with the minimum number of component pieces, capable of easy assembly at a minimum cost. Such considerations are of prime importance in automotive manufacture, where lightness in weight is also extremely important.

Accordingly, the present invention provides a centrifugal clutch for coupling a drive shaft to a driven member at rotary speeds above a predetermined threshold, comprising:

a centrifugal slider with a massive enlargement at one end and a first coupling formation;

a frame formed to carry the centrifugal slider on formations to constrain it to sliding motion between an extended radial position and a retracted radial position and to fit fixedly on the drive shaft to be driven by it, with the shaft at right-angles to the axis of sliding motion of the frame;

an output drive member mountable for free rotation on the drive shaft and formed for driving engagement with the driven member in use, and formed with a second coupling formation which connects drivingly with the first only when the centrifugal slider is at its extended position;

and means, located wholly within a recess in the centrifugal slider, for biasing the centrifugal slider towards its retracted position;

whereby rotation of the centrifugal slider and frame causes the massive enlargement to pull the centrifugal slider radially from its retracted to its extended radial position to cause the first and second coupling arrangements to interengage and thus to transmit rotary drive from the drive shaft to the driven member, but the biasing means causes disengagement when the rotation ceases, so as to decouple the drive shaft from the driven member.

Recessing the biasing means allows the clutch to be extremely compact in the axial direction, and by thus shortening the shaft the eccentric vibration of the output drive member is minimised, giving a stable structure with long life.

Preferably, the first coupling formation is at the other end of the centrifugal slider. This balances the impulsive forces upon engagement of the clutch. It is also advantageous that the coupling formation is then at a substantially shorter radius than the massive enlargement, at the point of engagement, because a larger impulsive force is then given as a "kick" to the output drive, freeing any possible jam or excessive friction.

The invention also provides a centrifugal clutch for coupling a drive shaft to a driven member at rotary speeds above a predetermined threshold, comprising:

a centrifugal slider with a massive enlargement at one end and a first coupling formation;

a frame formed to carry the centrifugal slider on formations to constrain it to sliding motion between an extended radial position and a retracted radial position, and to fit fixedly on the drive shaft to be driven by it, with the shaft at right-angles to the axis of sliding motion of the frame;

an output drive member mountable for free rotation on the drive shaft and formed for driving engagement with the driven member in use, and formed with a second coupling formation which connects drivingly with the first only when the centrifugal slider is at its extended position;

and a return spring acting on the centrifugal slider, and also bearing directly on the drive shaft in use, to bias the centrifugal slider toward its retracted position;

whereby rotation of the centrifugal slider and frame causes the massive enlargement to pull the centrifugal slider radially from its retracted to its extended radial position to cause the first and second coupling arrangements to interengage and thus to transmit rotary drive from the drive shaft to the driven member, but the spring causes disengagement when the rotation ceases, so as to decouple the drive shaft from the driven member.

With the spring bearing directly on the drive shaft, the arrangement is particularly compact, with the minimum number of parts, and the simplest construction.

Further the invention provides a drive assembly comprising a drive shaft coupled to the frame of a centrifugal clutch for coupling a drive shaft to a driven member at rotary speeds above a predetermined threshold, comprising:

a centrifugal slider with a massive enlargement at one end and a first coupling formation;

a frame formed to carry the centrifugal slider on formations to constrain it to sliding motion between an extended radial position and a retracted radial position, and to fit fixedly on the drive shaft to be driven by it, with the shaft at right-angles to the axis of sliding motion of the frame;

an output drive member mountable for free rotation on the drive shaft and formed for driving engagement with the driven member in use, and formed with a second coupling formation which connects drivingly with the first only when the centrifugal slider is at its extended position;

and means for biasing the centrifugal slider towards its retracted position;

whereby rotation of the centrifugal slider and frame causes the massive enlargement to pull the centrifugal slider radially from its retracted to its extended radial position to cause the first and second coupling arrangements to interengage and thus to transmit rotary drive from the drive shaft to the driven member, but the biasing means causes disengagement when the rotation ceases, so as to decouple the drive shaft from the driven member;

in which the drive shaft projects through the frame and the slider.

Extending the drive shaft through the whole clutch gives optimum stability, and ease of assembly.

Further, the invention provides a centrifugal clutch comprising driving and driven coaxial members, the radially inner member having a slider constrained to slide between an extended radial position at which it engages a tooth on the radially outer member and drivingly couples the members, and a retracted radial position at which it allows free rotary relative movement of the members;

a spring biasing the slider to its retracted position;

and a centrifugal crank lever, pivotally mounted on the radial inner member on an axis parallel to that of the members and spaced therefrom, having a massive enlargement at one end and pivotally connected to the slider at its other end such that rotation of the inner member causes the massive enlargement to turn the crank lever to drive the slider against the spring bias to its extended position, but the spring causes the slider to return to its retracted position when the clutch ceases rotation.

A method of assembly of a drive arrangement, according to the invention, comprises pre-assembling a centrifugal clutch and then mounting the pre-assembled clutch over a drive shaft to effect a push fit;

the clutch comprising a centrifugal slider carried by a frame, a gear for conveying rotary drive from the slider to an external driven member in use, and a spring biasing the slider to a radial position when it is out of driving engagement with the gear, the slider being formed so as to slide under centrifugal action against the spring bias into driving engagement with the gear when the clutch is rotated;

and the pre-assembled clutch having an axial opening, extending through the slider and the frame and axially into the gear, for receiving the drive shaft.

By retaining the spring in the slider such that there is still an opening for the free axial passage of the motor drive shaft through it, it is possible to use a stronger spring than if it were necessary to compress the spring during assembly. The use of a strong spring gives improved efficiency in disengaging the clutch in use. By carrying the spring wholly within the slider, the arrangement can be made more compact and its assembly can be simplified.

In order that the invention may be better understood, two embodiments will now be described, by way of example only, with reference to the accompanying diagrammatic drawings, in which:

FIG. 2 is a perspective view from the motor side of the assembled centrifugal clutch of FIG. 1, with the centrifugal slider in its retracted position;

FIG. 3 is a perspective view corresponding to FIG. 2 but with the centrifugal slider in its extended position;

FIG. 4 is a perspective view from the driven member side of the assembly of FIGS. 1 and 2;

Figure 1:
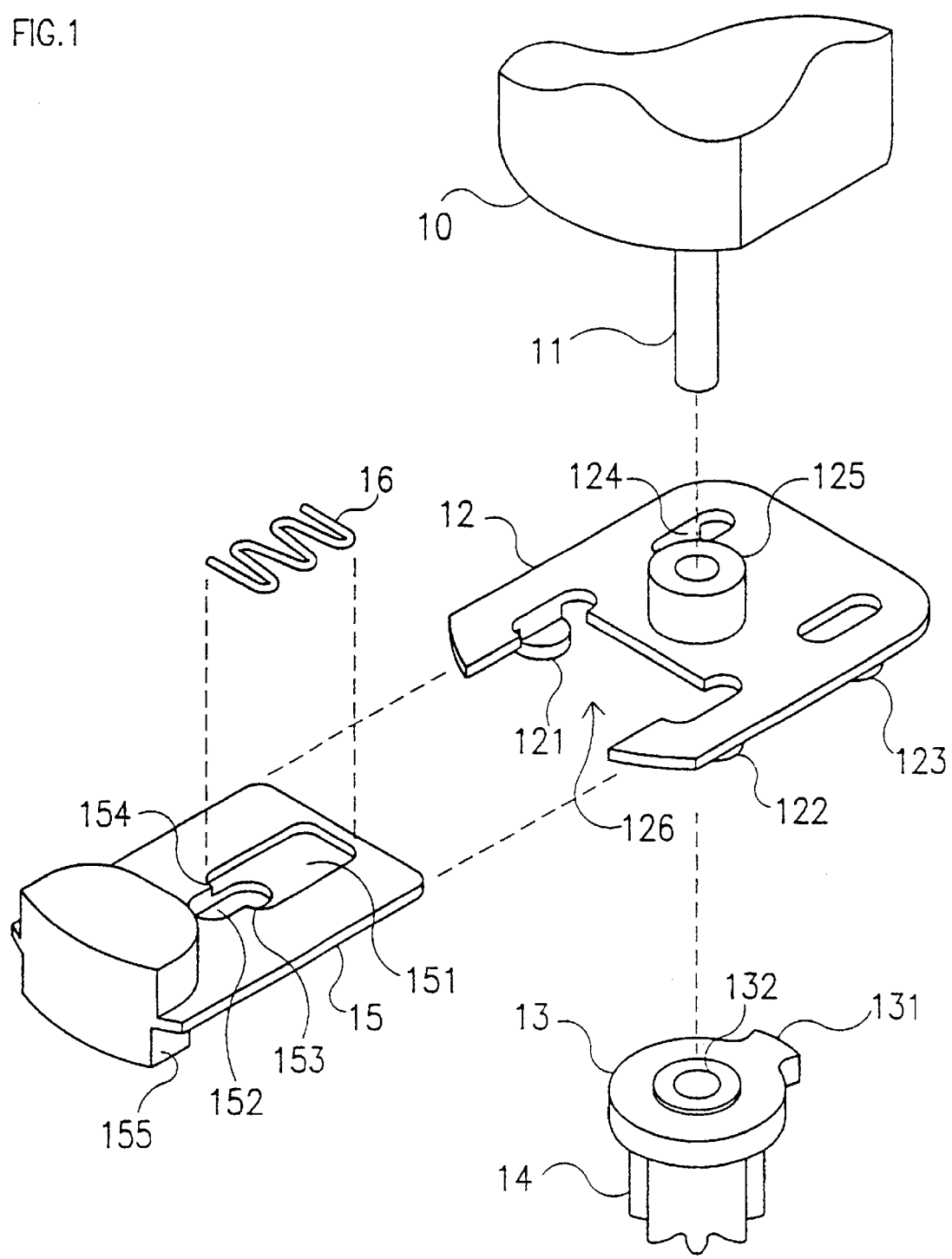
FIG. 1 is an exploded perspective view from the motor drive side of a centrifugal clutch embodying the invention and part of an electric drive motor.

A first embodiment will be described with reference to FIGS. 1 to 4.

A centrifugal clutch comprises a centrifugal slider 15, a spring 16, a frame 12 for connection to the drive shaft 11 of an electric motor 10, and an output drive member 13 which is a single toothed gear in this example.

The frame 12 is generally planar and rectangular, but is cut away at 126 to accommodate part of the centrifugal slider 15. Four flanges 121, 122, 123, 124 extending parallel to the plane of the frame 12 but spaced axially from it, are arranged in a rectangle to guide the centrifugal slider 15 and to constrain it to sliding motion transverse to the axis of the motor spindle 11. An integral bush 125 projecting axially from the centre of the frame 12 coincides with an aperture through the frame, for accommodating the motor spindle 11. The motor spindle 11 is knurled (not shown) to provide rough projections for engagement against the inner surface of the bush 125, to form a push-fit when the clutch pre-assembly is pushed over the motor spindle 11.

The centrifugal slider 15 is also generally planar and rectangular, with a length similar to that of the frame 12, but narrower in width so as to be accommodated within the guides 121 to 124. The slider 15 has a massive enlargement 155 at one end, projecting axially both above and below the plane of the slider. The radial exterior surface of the enlargement 155 is part-cylindrical, with its centre of curvature on the axis. The slider 15 has an oval slot 152 at its centre, through which the motor spindle 11 extends when assembled, such as to allow the slider 15 to slide radially between a retracted position as shown in FIG. 2 and an extended position as shown in FIG. 3.

The slider 15 is resiliently biased towards its retracted position as shown in FIG. 2 by means of a flat zig-zag steel spring 16 which is accommodated wholly within a shallow recess 151 in the surface of the slider 15. The spring 16 fits into the recess, with one end abutting against a pair of shoulders 153, 154 positioned about halfway along the opening 152, which still leaves an unobstructed opening equal to or slightly greater than the outer diameter of the spindle 11. This allows for automatic assembly of the clutch over the spindle 11, since it is not necessary to compress further the spring 16 during insertion of the clutch pre-assembly 12, 13, 15 over the spindle 11.

The output drive member comprises, in this example, a single-toothed gear 13 formed integrally with a multiply-toothed gear 14. The single tooth 131 of the first gear 13 projects radially beyond the teeth of the second gear 14. An axial opening 132, broader than the outer diameter of the motor spindle 11, allows the gears 13 and 14 to be accommodated on the spindle 11 but to rotate freely relative to the spindle 11. In use, the teeth on the second gear 14 convey motor drive to a driven member (not shown), when and only when the centrifugal slider 15 is in its extended position shown in FIG. 3, at which the single tooth 131 engages a tooth 156 (FIG. 4) on the centrifugal slider 15, projecting axially from the slider, away from the motor 10, and located at the end of the slider opposite to that of the massive enlargement 155.

The centrifugal clutch is assembled as follows. As shown in FIG. 1, the spring 16 is inserted into the recess 151, and the slider 15 is then slotted into the frame 12 until the unobstructed opening 152 is in register with the axial opening 125 in the frame 12. The spring is thus fully supported, and is carried wholly within the slider 15. The pre-assembled three components 12, 15, 16 are then pushed axially over the motor spindle 11 until a permanent push-fit is achieved, with part of the spindle 11 projecting from the clutch pre-assembly. The gears 13, 14 are then mounted over the projecting spindle 11, as shown more clearly in FIG. 4, and the combination of the motor, clutch and gear 14 is then assembled into the door latch (or alternative receiving assembly) for engagement with the driven member, as appropriate. This assembly can be fully automated, using pick-and-place action, as it is particularly simple and straight forward.

Whilst in this example the gears 13 and 14 are formed integrally, this is not essential: they could be formed as separate components, for example with a push-fit together.

In this example, the frame 12 and gears 13 and 14 are all plastics injection mouldings. The slider 15 can be of metal or plastic with a metal insert, to give it a sufficient mass for the centrifugal action and sufficient smoothness of sliding operation.

An important feature of this example is that the tooth 156 for engaging the gear pinion 13 is diametrically opposite the massive enlargement 155. Thus the clutch coupling arrangement is separated from the centrifugal mass arrangement, allowing for a more efficient power transfer in operation, and greater simplicity in construction. In the clutch disclosed for example in WO95/24534 (Rockwell), the massive enlargement functions itself as the coupling between the clutch halves, i.e. both are on the same radial side of the axis, and the coupling has to take place at the same extreme radial position. With the preferred feature, the coupling tooth 156 is diametrically opposite the enlargement 155, and the point of engagement of the tooth 156 and the gear tooth 131 is much closer to the axis, e.g. at half the radius of the enlargement 155. Thus the gear 13 can be smaller, and the power coupling more efficient. Firstly, the spindle acts as a pivot, and contributes to the dynamic stability of the clutch.

Secondly coupling takes place between facing surfaces of the gear tooth 131 and the tooth 156 at a smaller radius than that of the massive enlargement, e.g. at half the radius, which means a correspondingly greater force on the opposed surfaces; this means the contact area can be reduced, and this in turn reduces the likelihood of frictional resistance preventing retraction of the slider. Thirdly, with the coupling at a smaller radius, the gear 13, and the slider 15 and frame 12, can be made sufficiently rigid to reduce substantially their tendency to bend about the axis at the time of impact as the clutch engages, when there is an angular impulsive force.

A further novel feature of this arrangement is that the centrifugal slider 15 is spring biased against the motor spindle shaft 11, by direct contact between the spring 16 and the spindle 11. This allows for a reduction in the number of component parts.

Typically, when compared with conventional centrifugal clutches, the number of component parts has been reduced from nine down to four. This makes a significant saving in material costs and in assembly costs and the simplicity of the arrangement with reduced stresses gives it a longer lifecycle. Smaller housings may be used, leading to further savings, and greater adaptability to a variety of applications.

The invention also allows the motor drive spindle 11 to be shorter than with other conventional clutches, and this further assists in making the housing smaller.

As an alternative to the use of a spring, it would be possible to use a magnetic bias between the slider 15 and the other components. This could involve a permanent magnet acting on magnetic metallic parts of the components, with the force of the magnet balancing the centrifugal force at a predetermined speed of rotation.

Figure 5:
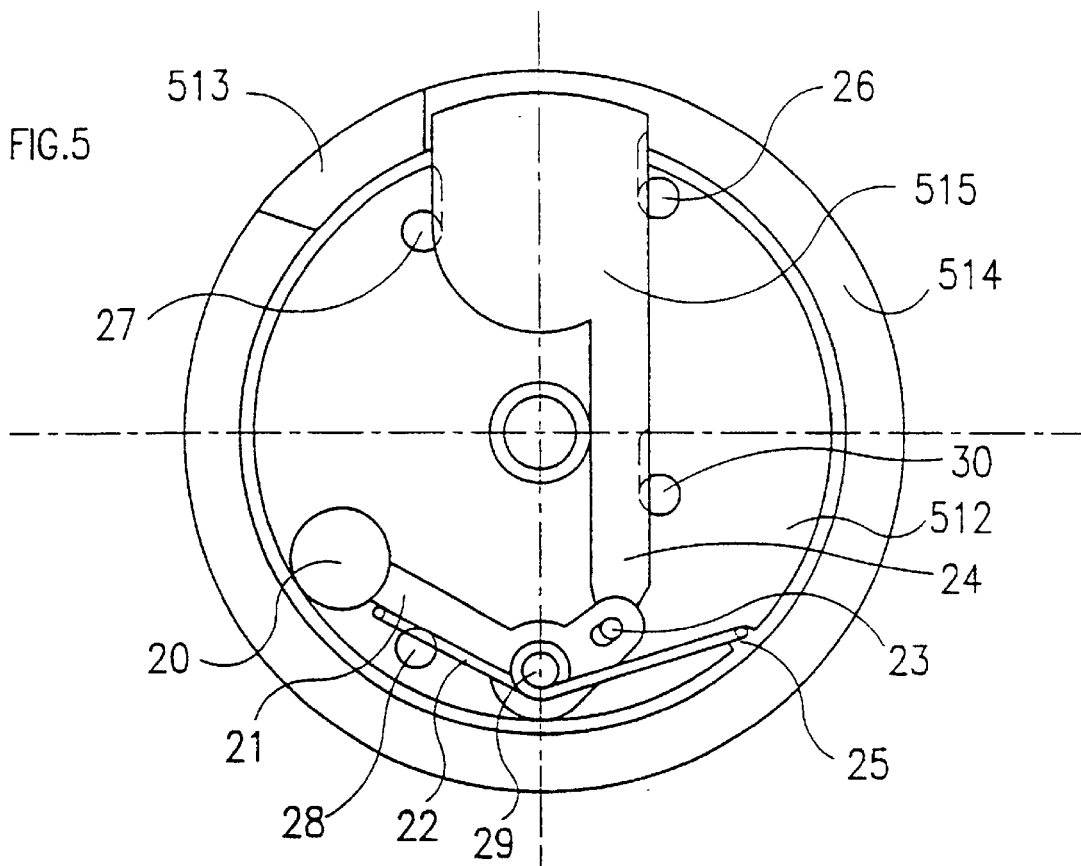
FIGS. 5 and 6 are plan views of a centrifugal clutch according to a second embodiment of the invention, with the centrifugal slider respectively extended and retracted.
Figure 6:
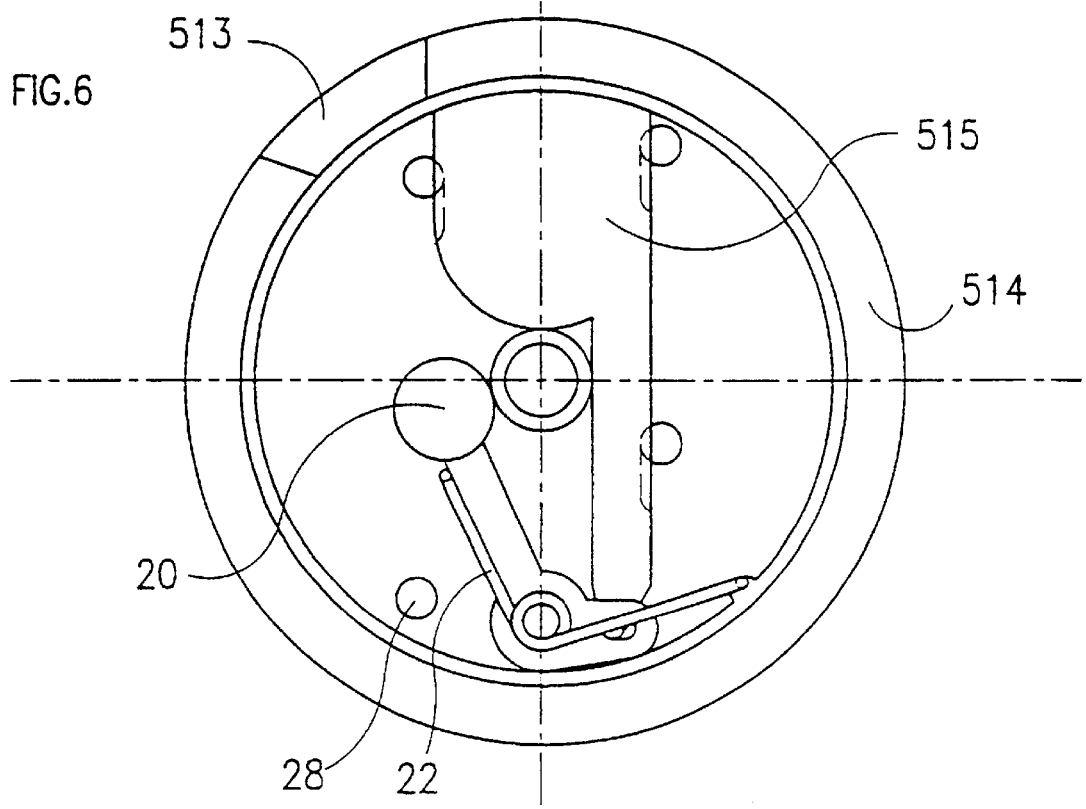

An alternative arrangement, as a second embodiment of the invention, is shown in FIGS. 5 and 6.

A centrifugal clutch comprises a driving cylinder 512 and coaxial driven cylinder 514. The radially inner, driving cylinder 512 is fixed to the motor drive spindle 11, and has a slider 515 constrained by pins 26, 27 and 30 on the inner cylinder to slide between an extended radial position, shown in FIG. 5, at which it engages a tooth 513 on the radially outer cylinder and drivingly couples the cylinders, and a retracted radial position, shown in FIG. 6, at which it allows free rotary relative movement of the cylinders. A coil spring 22, mounted over a pin 29, has one end 25 coupled to the rim of the inner cylinder 512, and the other end in engagement with a centrifugal crank lever 21 which is mounted pivotally on the same pin 29 on the inner cylinder 512. The crank lever 21 has a massive enlargement 20 at one end, at the end of a long radius arm; the other arm of the crank lever, which is shorter to provide leverage and a mechanical advantage, is coupled pivotally at 23 to the end of the centrifugal slider 24. Another pin 28 on the inner cylinder acts as an end stop to limit the anti-clockwise rotation of the crank lever 21 to the position shown in FIG. 5. At this limit position, the massive enlargement 20 does not interfere with the motion of the driven coaxial cylinder 514.

In this example, although it is not essential, the slider 24 also has a massive enlargement 515 at its radially outer end, opposite to that of the pivot point 23. This assists in the centrifugal action.

In use, when the motor spindle 11 is stationary, the spring 22 drives the crank lever 21 clockwise as shown in FIGS. 5 and 6, towards the position shown in FIG. 6, at which the slider 24 is retracted, and the clutch is disengaged. Once the motor speed has increased to a particular predetermined speed, the centrifugal force on the massive enlargement 515, combined with the centrifugal force on the massive enlargement 20, in combination overcome the spring bias, and drive the slider 24 to its extended position as shown in FIG. 5 When the rotation decelerates once again, the spring will eventually overcome the centrifugal forces and return the slider to its retracted position, to disengage the clutch.

It will be understood that alternative mechanical arrangements are possible for example to have a spring acting on the slider 24 instead of, or in addition to, the spring 21 acting on the crank lever. The centre of mass of the slider 24, in the example given, is displaced radially a considerable distance from the axis of the motor spindle 11, because of the massive enlargement 515, but in some examples this may not be necessary, depending upon the centrifugal force available from the enlargement 20 on the crank lever and the mechanical advantage provided by the crank lever, together with an allowance made for the frictional losses in the assembly.

The driving and driven "cylinders" need not be perfectly cylindrical, and could have less regular shapes, provided they are basically coaxial.

What is claimed is:

1. A centrifugal clutch for coupling a drive shaft to a driven member at rotary speeds above a pre-determined threshold, comprising:

a centrifugal slider with a massive enlargement at one end and a first coupling formation;

a frame formed to carry the centrifugal slider on formations to constrain it to sliding motion between an extended radial position and a retracted radial position, and to fit fixedly on the drive shaft to be driven by it, with the shaft at right-angles to the axis of sliding motion of the frame;

an output drive member mountable for free rotation on the drive shaft and formed for driving engagement with the driven member in use, and formed with a second coupling formation which connects drivingly with the first only when the centrifugal slider is at its extended position; and a return spring acting on the centrifugal slider, and also bearing directly on the drive shaft in use, to bias the centrifugal slider towards its retracted position;

whereby rotation of the centrifugal slider and frame causes the massive enlargement to pull the centrifugal slider radially from its retracted to its extended radial position to cause the first and second coupling arrangements to interengage and thus to transmit rotary drive from the drive shaft to the driven member, but the spring causes disengagement when the rotation ceases, so as to decouple the drive shaft from the driven member.

2. A centrifugal clutch according to claim 1, in which the spring is flat.

3. A centrifugal clutch according to claim 2, in which the spring has a zig-zag shape.

4. A centrifugal clutch according to claim 1, in which the frame is a plastics injection molding.

5. A centrifugal clutch according to claim 1, or 4, in which the output drive member is a plastics injection molding.

6. A centrifugal clutch according to claim 1, in which the drive shaft projects through the frame and the slider.

7. A drive assembly comprising a drive shaft coupled to the frame of a centrifugal clutch for coupling a drive shaft to a driven member at rotary speeds above a predetermined threshold, comprising:

a centrifugal slider with a massive enlargement at one end and a first coupling formation;

a frame formed to carry the centrifugal slider on formations to constrain it to sliding motion between an extended radial position and a retracted radial position, and to fit fixedly on the drive shaft to be driven by it, with the shaft at right-angles to the axis of sliding motion of the frame;

an output drive member mountable for free rotation on the drive shaft and formed for driving engagement with the driven member in use, and formed with a second coupling formation which connects drivingly with the first only when the centrifugal slider is at its extended position;

and means for biasing the centrifugal slider towards its retracted position;

whereby rotation of the centrifugal slider and frame causes the massive enlargement to pull the centrifugal slider radially from its retracted to its extended radial position to cause the first and second coupling arrangements to interengage and thus to transmit rotary drive from the drive shaft to the driven member, but the biasing means causes disengagement when the rotation ceases, so as to decouple the drive shaft from the driven member;

in which the drive shaft projects through the frame and the slider.

8. A drive assembly according to claim 7, in which the frame is a plastics injection moulding.

9. A drive assembly according to claim 7 or 8, in which the output drive member is a plastics injection moulding.

10. A centrifugal clutch comprising:

driving and driven coaxial members, a radially inner member having a slider constrained to slide between an extended radial position at which it engages a tooth on a radially outer member and drivingly couples the members, and a retracted radial position at which it allows free rotary relative movement of the members;

a spring biasing the slider to its retracted position; and a centrifugal crank lever, pivotally mounted on the radial inner member on an axis parallel to that of the members and spaced therefrom, having a massive enlargement at one end and pivotally connected to the slider at its other end such that rotation of the inner member causes the massive enlargement to turn the crank lever to drive the slider against the spring bias to its extended position, but the spring causes the slider to return to its retracted position when the clutch ceases rotation.

11. A centrifugal clutch according to claim 10, in which the driving and driven coaxial cylinders are plastics injection mouldings.

12. A centrifugal clutch according to claim 11, in which the crank lever is also a plastics injection moulding.

13. A motor drive arrangement, comprising an electric motor whose output shaft is connected to a centrifugal clutch according to any one of claim 1, 7 or 10.

14. A method of assembly of a drive arrangement, comprising:

pre-assembling a centrifugal clutch and then mounting the pre-assembled clutch over a drive shaft to effect a push fit;

the clutch comprising a centrifugal slider carried by a frame, a gear for conveying rotary drive from the slider to an external driven member in use, and a spring which abuts against the drive shaft and biases the slider to a radial position when it is out of driving engagement with the gear, the slider being formed so as to slide under centrifugal action against the spring bias into driving engagement with the gear when the clutch is rotated; and the pre-assembled clutch having an axial opening, extending through the slider and the frame and axially into the gear, for receiving the shaft.

15. A method according to claim 14, in which the drive shaft is that of a motor.

16. A centrifugal clutch for coupling a drive shaft to a driven member at rotary speeds above a predetermined threshold, comprising:

a centrifugal slider with a massive enlargement at one end and a first coupling formation;

a frame formed to carry the centrifugal slider on formations to constrain it to sliding motion between an extended radial position and a retracted radial position, and to fit fixedly on the drive shaft to be driven by it, with the shaft at right-angles to the axis of sliding motion of the frame;

an output drive member mountable for free rotation on the drive shaft and formed for drive engagement with the driven member in use, and formed with a second coupling formation which connects drivingly with the first only when the centrifugal slider is at its extended position;

and means, located wholly within a recess in the centrifugal slider, for biasing the centrifugal slider towards its retracted position;

whereby rotation of the centrifugal slider and frame causes the massive enlargement to pull the centrifugal slider radially from its retracted to its extended radial position to cause the first and second coupling arrangements to interengage and thus to transmit rotary drive from the drive shaft to the driven member, but the biasing means causes disengagement when the rotation causes, so as to decouple the drive shaft from the driven member.

17. A method of assembly of a drive arrangement, comprising preassembling a centrifugal clutch and then mounting the pre-assembled clutch over a drive shaft to effect a push fit;

the clutch comprising a centrifugal slider carried by a frame, a gear for conveying rotary drive from the slider to an external driven member in use, and a spring biasing the slider to a radial position when it is out of driving engagement with the gear, the slider being formed so as to slide under centrifugal action against the spring bias into driving engagement with the gear when the clutch is rotated;

and the pre-assembled clutch having an axial opening, extending through the slider and the frame and axially into the gear, for receiving the drive shaft.

* * * * *